Sept. 8, 1964  E. M. JOHNSON  3,148,248
ELECTROMAGNETIC TRANSDUCER SUPPORTING ASSEMBLY
Filed Aug. 19, 1960
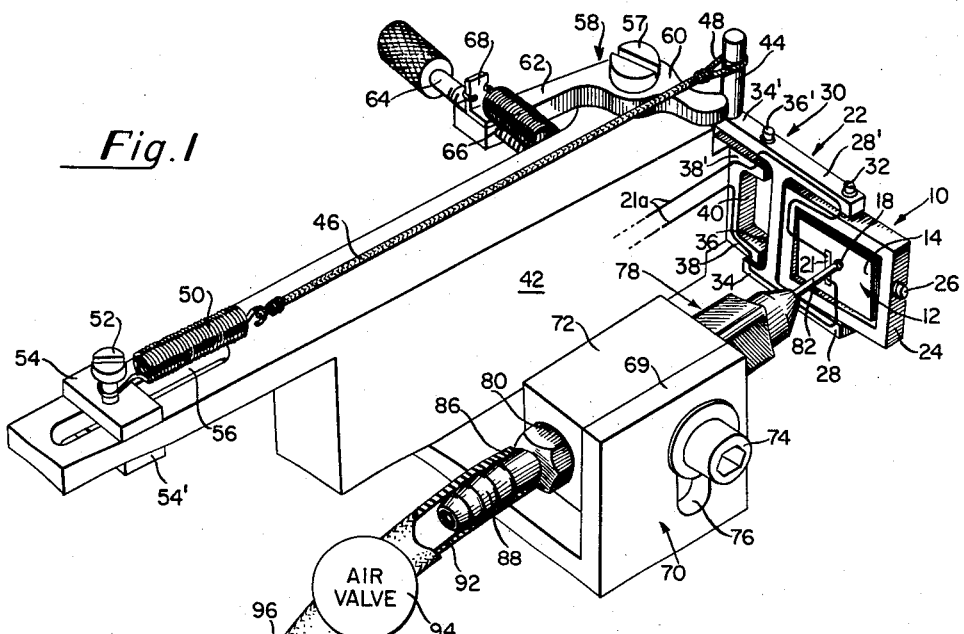
Fig. 1
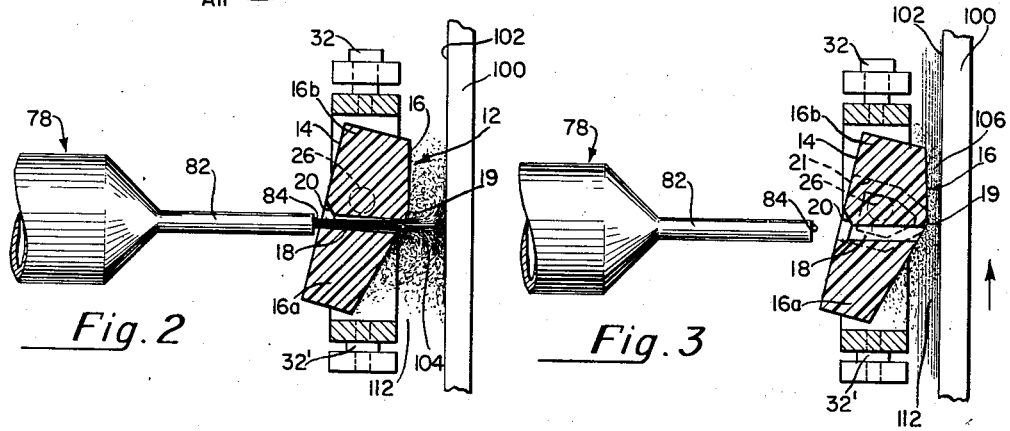
Fig. 2
Fig. 3
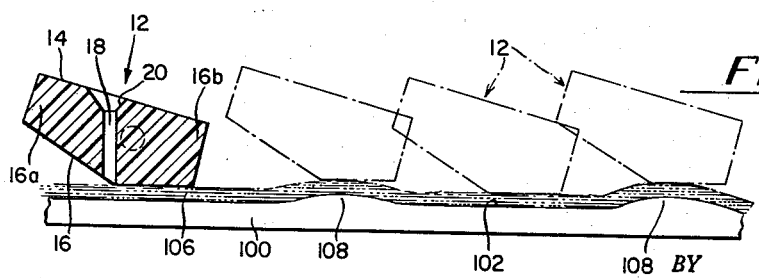
Fig. 4
INVENTOR.
EDWARD M. JOHNSON
BY
*Carl Fissell Jr.*
AGENT

United States Patent Office 3,148,248
Patented Sept. 8, 1964

3,148,248
ELECTROMAGNETIC TRANSDUCER
SUPPORTING ASSEMBLY
Edward M. Johnson, King of Prussia, Pa., assignor to Burroughs Corporation, Detroit, Mich., a corporation of Michigan
Filed Aug. 19, 1960, Ser. No. 50,705
4 Claims. (Cl. 179—100.2)

This invention relates generally to electromagnetic transducer mounting and supporting apparatus and more particularly, although not necessarily exclusively, to a novel air loading and air supporting means for poising an electromagnetic transducer above a rapidly moving magnetic member such as a drum, disc, tape etc. With still more particularity, the present invention relates to a novel positioning mechanism for an electromagnetic transducer.

It is the primary object of the invention to provide apparatus for positioning an electromagnetic transducer adjacent a recording surface without damaging either the transducer or the recording surface.

It is another object of the invention to provide transducer apparatus wherein the magnitude of the operating gap between the transducer and the recording surface is calibrated in micro inches.

Another important object of the present invention is to provide means for positioning an electromagnetic recording member in a "flying" operative relationship relative to a recording surface with the minimum of clearance therebetween.

In accordance with the foregoing objects and first briefly described herein, the present invention comprises means providing a hydrostatic cushion or film of air or similar fluid for floating an electromagnetic transducer adjacent a recording medium until a desired relative speed between the two is attained after which the hydrostatic cushion is removed permitting the transducer to "fly" on a hydrodynamic air film or cushion generated between the recording medium and the transducer by the rotation of the recording medium relative to the transducer.

More specifically in accordance with the illustrated embodiment the present invention comprises a mounting and suspension apparatus for an electromagnetic transducer wherein the transducer is provided with an aperture therethrough and wherein means is provided for forcing a fluid such as air under pressure through said aperture against an adjacent recording surface whereby said transducer is adapted to remain spaced from said recording surface until such surface assumes a desired relative degree of motion with respect to the transducer after which the transducer is left in a floating condition riding on a thin film of air generated by the motion of the transducer.

Other objects of the invention will be pointed out in the following description and the claims and illustrated in the accompanying drawings, which disclose, by way of example, the principle of the invention and the best mode which has been contemplated, applying that principle.

In the drawings:

FIG. 1 is an isometric view of the preferred embodiment of the invention;

FIG. 2 is a sectional elevational view illustrating the pressure mode of operation of the transducer suspension mechanism;

FIG. 3 is a view similar to FIG. 2 illustrating the transducer in air bearing relationship with a recording surface; and, FIG. 4 is an elevational view drawn to an exaggerated scale and illustrating the operation of the present invention with respect to a recording member having surface aberrations therein.

For a more detailed description of the invention reference is now made to the various figures of the drawing (FIGS. 1 through 4) which will be discussed simultaneously, and which illustrate the preferred embodiment thereof which has been drawn to an exaggerated scale in order to better illustrate the details of its construction and operation. The entire transducer apparatus is designated by reference numeral 10 and in the present form may include a rectangular member 12 having top planar surface 14 and a bottom angular surface 16, including a leading and a trailing portion 16a and 16b respectively, as seen more particularly in FIGS. 2 and 3. An aperture 18 extending from one surface to the other through the transducer 12 is offset to one side of the junction or apex 19 of the angled bottom surface portions 16a and 16b. The angle between these two intersecting surfaces although appearing quite large on the drawing is actually extremely small and unapparent to the human eye without the aid of auxiliary measuring equipment. The portion of the opening adjacent the planar surface 14 is recessed and funneled-shaped as indicated by the reference character 20, for purposes to be explained hereinafter.

As shown in the illustrated embodiment, the transducer may include one or more electromagnetic recording and reproducing cores 21 of ferrite or other suitable material. The lead wires 21a for the cores, only one core being shown for convenience of illustration, are brought out adjacent the various pivots of the suspension which will now be described in detail.

The transducer or head 12 is gimbal mounted on a structure 22 which includes an inner rigid rectangular member 24 of metal or other suitable material, to which it is rockably pivoted by means of pivots 26 on opposite sides thereof, only one of which is shown (FIG. 1). The structure 24 is in turn rockably pivotally mounted within the parallel legs 28–28' of the member 30 by means of the pivots 32–32', FIGS. 1 and 2. The transducer 12 including the core or cores 21 as the case may be, is thus free to pivot in a plurality of directions about two axes substantially perpendicular to each other.

The member 30 is provided with a pair of parallel backwardly extending legs 34—34' each of which is mounted by means of oppositely disposed pivots 36–36' to respective legs 38–38' of a support member 40. The support 40 is attached in a conventional manner to the rigid mounting member 42. The lead wires 21a may be brought out along the member 42 in suitable fashion and supported therealong for attachment to other associated apparatus with which the apparatus embodying the present invention is employed.

The longer leg 34' of member 30 is provided with an upstanding pin or stud 44 to which is attached a biasing or loading assembly consisting in the present instance, of a short length of wire or cord 46 attached at one end by a loop 48 to the member 44 and at the other end to one end of a coil spring 50 which has its other end secured to an adjustably mounted pin 52 carried by oppositely disposed blocks 54–54' slidably movable within a slot 56 in the end of the mounting member 42 of the assembly. Pivotally mounted on member 42 by means of pivot screw 57 is a substantially L-shaped retracting lever 58 the forward extending angular arm 60 of which is arranged to be brought into contact with the member 44 while the rearwardly extending arm 62 is threaded and provided with an adjusting screw 64 disposed therethrough. A preloading tensioning spring 66 is secured at one end to the member 42 while the opposite end thereof is mounted on a tab 68 projecting vertically away from the arm 62 of the retracting lever 58. Spring 66 thus tends to bias the end 60 of retract lever 58 into engagement with the pin 44.

Adjustably mounted on the vehicle leg 69 of an angle bracket 70 extending outwardly from mounting member 42 is a block 72 provided with an adjusting nut 74 mounted in the bracket 70 through a slot 76 therein. A fluid injector nozzle 78 is slidably disposed through a horizontal aperture or bore 80 in the block 72 and includes a thin, elongated, hollow, needle-like jet 82, the outlet end 84 of which is adjustably positioned adjacent the funnel-shaped recess 20 of aperture 18 in the head 12. It is to be noted that the clearance adjustment between the member 78 and the head 12 is maintained such that the jet 82 has no physical contact with the head 12 regardless of the movement of the latter. The opposite or inlet end 86 of the injector nozzle 78 is provided with a ridged hose or tube connection 88 for receiving a tube or hose 92. The hose 92 includes an operating valve 94 operably associated therewith. Air or gas under suitable pressure may be introduced into the end 96 of the hose 92 as will now be explained.

In the operation of the present apparatus the final gap or clearance between the transducer and the recording surface 102, which in this illustrated embodiment is a rotatable disc, is determined primarily by the head loading, the surface velocity and the head contour. The present gap is in the range of .000050 to .000250". At the start of an operation the recording disc 100 is stationary, the gimbal mounted transducer 10 is fully retracted from the recording surface 102 and the valve 94 is closed. Air under pressure is applied to the injector nozzle 78 by opening the valve 94 which permits the air to pass through the nozzle to be expelled at high speed out of the end 84 and through hole 18 in the head to impinge against the disc surface 102, FIG. 2. The transducer is then lowered into proximity with the recording surface 102 by means of the retract lever 58, the knob 64 of which is turned in the proper direction to permit the end 60 to rotate about pivot 57 in a clockwise direction causing the spring 50 to rotate the transducer mounting mechanism in a counterclockwise direction about pivots 36–36', as seen in FIG. 1, thereby to move the transducer toward the recording surface 102 to be supported on a thin film 104 of approximately .001 of compressed air emanating from the hole 18.

The recording member 100 is accelerated to the desired velocity which in this case is 3600 r.p.m.'s. The transducer is able to follow the runout of the recording surface 102 during this time because of the compressed air film 104 beneath the transducer. The air valve 94 is then closed shutting off the external air supply. The transducer 10 is now lowered from the position shown in FIG. 2 to the position shown in FIG. 3 in which, as will now be described, it can assume the normal flying gap 106 for the given hydrodynamic state. It is important that the compressed air be removed at a slow rate in order to prevent the head from accidentally penetrating the generated air film 104 and thus damaging either the head or the magnetizable surface 102 or the recording member 100.

However, as is apparent, the gimbal mounting permits the head to rock at will. In order to "fly" the head over the disc without contacting the record medium the head is moved toward the record medium to within a very close range. This places the leading portion 16a of the head 12 at an angle with respect to the disc 100 while the trailing portion 16b is substantially parallel to the disc. Neither portion actually touches the recording surface 102 during the rotation of the record medium. The air flowing between the disc and the head due to the rotation of the disc tends to wedge or compress itself in the area 112 immediately adjacent and on both sides of the head gap. This action of wedging creates a lifting force component substantially perpendicular to the recording surface tending to push the head away therefrom. After the compressed air is removed by closing valve 94 the head is permitted to settle down and ride on this air film thus to assume its desired flying gap position relating to the surface 102 of the recording member.

As illustrated in the various dotted outline and solid line positions of FIG. 4, the novel suspension mechanism of the present invention permits the transducer 10 and thus the head 12 to assume varying positions relative to the disc 100 but still remain suitably disposed at the desired gap distance from the magnetizable material or surface 102 without touching the material in spite of surface irregularities 108 and, in fact, maintaining the head at the desired tolerance during the operation thereof.

When it is desired to stop the operation of the apparatus valve 94 is opened causing air under pressure to strike the disc surface 102 via the nozzle 78 and aperture 18. The disc 100 is then slowed and finally stopped. As the generated air film slowly disintegrates the transducer is supported adjacent the disc surface by means of the compressed air film. When the disc has stopped rotating the head is retracted away therefrom by means of the lever 58 after which the valve 94 is closed shutting off the air supply.

In the apparatus embodying the present invention the transducer 12 effectively operates as a hydrostatic bearing during the start and stop portions of the operation. The air for the hydrostatic floating being supplied to the transducer through the nozzle 78. When the disc is up to its desired operating speed the external air supply is shut off. As the hydrostatic pressure gradually diminishes the transducer seeks its normal head to disc spacing as a hydrodynamic bearing cushioned on the air film 106 generated between the disc and the transducer as a result of the rotation of the disc.

What is claimed is:

1. Electromagnetic transducer mounting assembly comprising, a frame, a yoke member pivotally mounted on said frame for movement toward and away therefrom, means mounting an electromagnetic transducer on said yoke member for movement about two axes substantially perpendicular to each other, said transducer being provided with an aperture extending therethrough and having an inlet and an outlet portion, said outlet opening being disposed adjacent a recording medium, means biasing said transducer mounting means away from said frame toward the surface of said recording medium, retracting means for said transducer mounting assembly operably associated with said yoke member for moving said transducer toward said frame and away from said recording surface, and, means disposed adjacent the inlet portion of said aperture and spaced therefrom for applying air under pressure into and through said aperture, said last means including means for adjusting the relative spacing between said air pressure means and said aperture inlet.

2. The construction according to claim 1 and further including control means for cutting off the air pressure.

3. Electromagnetic transducer mounting assembly comprising,
 (a) a frame
 (b) a yoke member pivotally mounted at right angles to said frame for movement toward and away therefrom,
 (c) means mounting an electromagnetic transducer on said yoke member for movement about two axes substantially perpendicular to each other,
 (d) said transducer being provided with an aperture extending therethrough and having an inlet and an outlet portion,
 (e) said outlet opening being disposed adjacent a recording medium,
 (f) means for adjustably positioning said transducer mounting means adjacent said frame toward the surface of said recording medium, (g) adjustable retracting means for said transducer mounting assembly operably associated with said yoke member for moving said transducer toward said frame and away from said recording surface, (h) means disposed adjacent the inlet portion of said aperture and spaced therefrom for applying air under pressure into and through said aperture, (i) said last means including means for adjusting the relative spacing between said air pressure means and said aperture inlet, and (j) means for adjusting the axial orientation of said air pressure supplying means relative to said aperture.

4. Electromagnetic transducer mounting assembly comprising, (a) a frame, (b) a yoke member pivotally mounted on said frame for movement toward and away therefrom, (c) means mounting an electromagnetic transducer on said yoke member for movement about two axes substantially perpendicular to each other, (d) said transducer including a pair of adjacent angled faces of different relative lengths and provided with an aperture offset to one side of the mounting means and extending therethrough and having a funnel shaped inlet portion for directing the incoming air into the aperture and an outlet portion intersecting one of said faces at the substantial apex of said angled faces, (e) said outlet opening extending through the longer of said faces and being disposed adjacent a recording medium, (f) a coiled spring biasing said transducer mounting means away from said frame toward the surface of said recording medium, (g) a pivoted substantially L-shaped lever for said transducer mounting assembly operably associated with said yoke member for moving said transducer toward said frame and away from said recording surface, and (h) means disposed adjacent the inlet portion of said aperture and spaced therefrom for applying air under pressure into and through said aperture, (i) said last means including means for adjusting the relative spacing between said air pressure means and said aperture inlet.

References Cited in the file of this patent

UNITED STATES PATENTS

| | | |
|---|---|---|
| 2,862,781 | Baumeister | Dec. 2, 1958 |
| 2,928,709 | Baumeister | Mar. 15, 1960 |
| 2,969,435 | Lynott | Jan. 24, 1961 |
| 2,972,738 | Sliter | Feb. 21, 1961 |